United States Patent
Love et al.

(10) Patent No.: US 9,740,632 B1
(45) Date of Patent: Aug. 22, 2017

(54) SNAPSHOT EFFICIENCY (71) Applicant: EMC Corporation, Hopkinton, MA (US)

(72) Inventors: Phil Love, San Jose, CA (US); Kirill Shoikhet, Raanana (IL); Renen Hallak, Sde Warburg (IL); Ido Halevi, Givat Ada (IL); Irit Lempel, Caesarea (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 589 days.

(21) Appl. No.: 14/496,359

(22) Filed: Sep. 25, 2014

(51) Int. Cl.
G06F 12/10 (2016.01)
G06F 17/30 (2006.01)
G06F 12/1018 (2016.01)

(52) U.S. Cl.
CPC .... *G06F 12/1018* (2013.01); *G06F 17/30324* (2013.01)

(58) Field of Classification Search
CPC ........................ G06F 12/1018; G06F 17/30324
See application file for complete search history.

(56) References Cited

U.S. PATENT DOCUMENTS

| | | | |
|---|---|---|---|
| 5,860,137 A | 1/1999 | Raz et al. | |
| 6,643,654 B1 | 11/2003 | Patel et al. | |
| 6,671,694 B2 | 12/2003 | Baskins et al. | |
| 7,908,436 B1 | 3/2011 | Srinivasan et al. | |
| 8,200,923 B1 | 6/2012 | Healey et al. | |
| 8,478,951 B1 | 7/2013 | Healey et al. | |
| 2005/0125626 A1 | 6/2005 | Todd | |
| 2005/0144416 A1 | 6/2005 | Lin | |
| 2005/0193084 A1 | 9/2005 | Todd et al. | |
| 2006/0031653 A1 | 2/2006 | Todd et al. | |
| 2006/0271540 A1 | 11/2006 | Williams | |
| 2009/0216953 A1 | 8/2009 | Rossi | |
| 2009/0222596 A1 | 9/2009 | Flynn et al. | |

(Continued)

FOREIGN PATENT DOCUMENTS

| | | |
|---|---|---|
| EP | 1804157 | 7/2007 |
| WO | WO 2010/019596 | 2/2010 |

(Continued)

OTHER PUBLICATIONS

Office Action dated Aug. 27, 2015 corresponding to U.S. Appl. No. 14/228,971; 23 Pages.

(Continued)

*Primary Examiner* — Adam M Queler
*Assistant Examiner* — Kenneth Tsang
(74) *Attorney, Agent, or Firm* — Daly, Crowley, Mofford & Durkee, LLP (57) ABSTRACT

In one aspect, a method includes receiving a request to write to an offset in a first logical device, determining a second logical device that wrote to the offset, the second logical device being an ancestor of the first logical device in a hierarchical tree of snapshots, determining from decedents of the second logical device in the hierarchical tree whether data in the offset of the second logical device is shadowed data or partially shadowed data, removing address-to-hash mapping for the offset of the second logical device if the data for the offset is shadowed and moving address-to-hash mapping to a single descendent of the second logical device if the data for the offset is partially shadowed.

19 Claims, 9 Drawing Sheets

(56) References Cited

U.S. PATENT DOCUMENTS

| | | | |
|---|---|---|---|
| 2010/0042790 | A1 | 2/2010 | Mondal et al. |
| 2010/0180145 | A1 | 7/2010 | Chu |
| 2010/0250611 | A1 | 9/2010 | Krishnamurthy |
| 2011/0087854 | A1 | 4/2011 | Rushworth et al. |
| 2011/0137916 | A1 | 6/2011 | Deen et al. |
| 2012/0124282 | A1 | 5/2012 | Frank et al. |
| 2012/0158736 | A1 | 6/2012 | Milby |
| 2013/0036289 | A1 | 2/2013 | Welnicki et al. |
| 2013/0305002 | A1* | 11/2013 | Hallak ............ G06F 3/061 711/162 |
| 2013/0318053 | A1 | 11/2013 | Provenzano et al. |

FOREIGN PATENT DOCUMENTS

| | | |
|---|---|---|
| WO | WO 2010/040078 | 4/2010 |
| WO | WO 2012/066528 | 5/2012 |

OTHER PUBLICATIONS

Response to Office Action dated Aug. 27, 2015 corresponding to U.S. Appl. No. 14/228,971; Response dated Jan. 14, 2016; 10 Pages.
U.S. Appl. No. 14/228,971, filed Mar. 28, 2014, Shoikhet et al.
U.S. Appl. No. 14/228,360, filed Mar. 28, 2014, Lempel et al.
U.S. Appl. No. 14/979,890, filed Dec. 28, 2015, Meiri et al.
Final Office Action dated Feb. 25, 2016 corresponding to U.S. Appl. No. 14/228,971; 27 Pages.
Request for Continued Examination (RCE) and Response to Final Office Action dated Feb. 25, 2016 corresponding to U.S. Appl. No. 14/228,971; Response dated May 25, 2016; 12 Pages.
U.S. Office Action dated Jun. 10, 2016 corresponding to U.S. Appl. No. 14/228,971; 27 Pages.
Response to U.S. Office Action dated Jun. 10, 2016 corresponding to U.S. Appl. No. 14/228,971; Response dated Aug. 17, 2016; 10 Pages.
U.S. Final Office Action dated Oct. 4, 2016 corresponding to U.S. Appl. No. 14/228,971; 37 Pages.
Request for Continued Examination (RCE) and Response to Final Office Action dated Oct. 4, 2016 corresponding to U.S. Appl. No. 14/228,971; RCE and Response dated Jan. 4, 2017; 19 Pages.
U.S. Non-Final Office Action dated Feb. 9, 2017 for U.S. Appl. No. 14/228,971; 38 Pages.
Response to U.S. Non-Final Office Action dated Feb. 9, 2017 for U.S. Appl. No. 14/228,971; Response dated May 9, 2017; 12 Pages.
Ben-Moshe et al.; "Hash-Based Replication;" U.S. Appl. No. 14/037,577, filed Sep. 26, 2013; 43 Pages.
Meiri et al.; "Hierarchical Volume Tree;" U.S. Appl. No. 14/037,511, filed Sep. 26, 2013; 33 Pages
Meiri et al.; "Data Reduction Techniques in a Flash-Based Key/Value Cluster Storage;" U.S. Appl. No. 14/230,405, filed Mar. 31, 2014; 46 Pages.
Meiri; "Encrypting Data in a Flash-Based Contents-Addressable Block Device;" U.S. Appl. No. 14/230,414, filed Mar. 31, 2014; 41 Pages.
Halevi et al.; "Hash-Based Replication Using Short Hash Handle and Identity Bit;" U.S. Appl. No. 14/317,449, filed Jun. 27, 2014; 45 Pages.
Meiri et al.; "Adjusting Consistency Groups During Asynchronous Replication;" U.S. Appl. No. 14/494,895, filed Sep. 24, 2014; 45 Pages.
Chen et al.; "Suspending Data Replication;" U.S. Appl. No. 14/494,899, filed Sep. 24, 2014; 40 Pages.
U.S. Appl. No. 12/945,915.
PCT Advance E-Mail Transmittal of IPR dated May 30, 2013 corresponding to Pat. App. No. PCT/IL2011/000692; 1 Page.
PCT International Preliminary Report dated May 30, 2013 corresponding to Pat. App. No. PCT/IL2011/000692; 1 Page.
PCT Written Opinion of the ISA dated May 30, 2013 corresponding to Pat. App. No. PCT/IL2011/000692; 5 Pages.
PCT Notification of Transmittal of ISR and Written Opinion dated Dec. 1, 2011 corresponding to Pat. App. No. PCT/IL2011/000692; 1 Page.
PCT International Search Report dated Dec. 1, 2011 corresponding to Pat. App. No. PCT/IL2011/000692; 4 Pages.
PCT Written Opinion of the ISA dated Dec. 1, 2011 corresponding to Pat. App. No. PCT/IL2011/000692; 5 Pages.
Yadin-Lempel et al., "Accessing Data in Hierarchical Snapshots;" U.S. Appl. No. 14/228,360, filed Mar. 28, 2014; 21 Pages.

* cited by examiner

| OFFSET \ IID | 1 | 2 | 3 | 4 | 5 | 6 | 7 | 8 | 9 |
|---|---|---|---|---|---|---|---|---|---|
| 1 (502a) | 1 | 1 | 0 | 1 | 0 | 1 | 0 | 0 | 0 |
| 2 (502b) | 1 | 1 | 0 | 0 | 0 | 0 | 0 | 1 | 0 |
| 3 (502c) | 1 | 0 | 0 | 1 | 0 | 0 | 1 | 1 | 1 |
| 4 (502d) | 1 | 0 | 1 | 1 | 1 | 0 | 1 | 0 | 0 |
| 5 (502e) | 1 | 0 | 0 | 0 | 1 | 0 | 0 | 0 | 0 |
| 6 (502f) | 1 | 0 | 0 | 0 | 0 | 0 | 1 | 0 | 0 |

SNAPSHOT EFFICIENCY

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes receiving a request to write to an offset in a first logical device, determining a second logical device that wrote to the offset, the second logical device being an ancestor of the first logical device in a hierarchical tree of snapshots, determining from decedents of the second logical device in the hierarchical tree whether data in the offset of the second logical device is shadowed data or partially shadowed data, removing address-to-hash mapping for the offset of the second logical device if the data for the offset is shadowed and moving address-to-hash mapping to a single descendent of the second logical device if the data for the offset is partially shadowed.

In another aspect, an apparatus includes electronic hardware circuitry configured to receive a request to write to an offset in a first logical device, determine a second logical device that wrote to the offset, the second logical device being an ancestor of the first logical device in a hierarchical tree of snapshots, determine from decedents of the second logical device in the hierarchical tree whether data in the offset of the second logical device is shadowed data or partially shadowed data, remove address-to-hash mapping for the offset of the second logical device if the data for the offset is shadowed; and move address-to-hash mapping to a single descendent of the second logical device if the data for the offset is partially shadowed.

In a further aspect, an article includes a non-transitory computer-readable medium that stores computer-executable instructions. The instructions cause a machine to receive a request to write to an offset in a first logical device, determine a second logical device that wrote to the offset, the second logical device being an ancestor of the first logical device in a hierarchical tree of snapshots, determine from decedents of the second logical device in the hierarchical tree whether data in the offset of the second logical device is shadowed data or partially shadowed data, remove address-to-hash mapping for the offset of the second logical device if the data for the offset is shadowed and move address-to-hash mapping to a single descendent of the second logical device if the data for the offset is partially shadowed.

DETAILED DESCRIPTION

Figure 1:
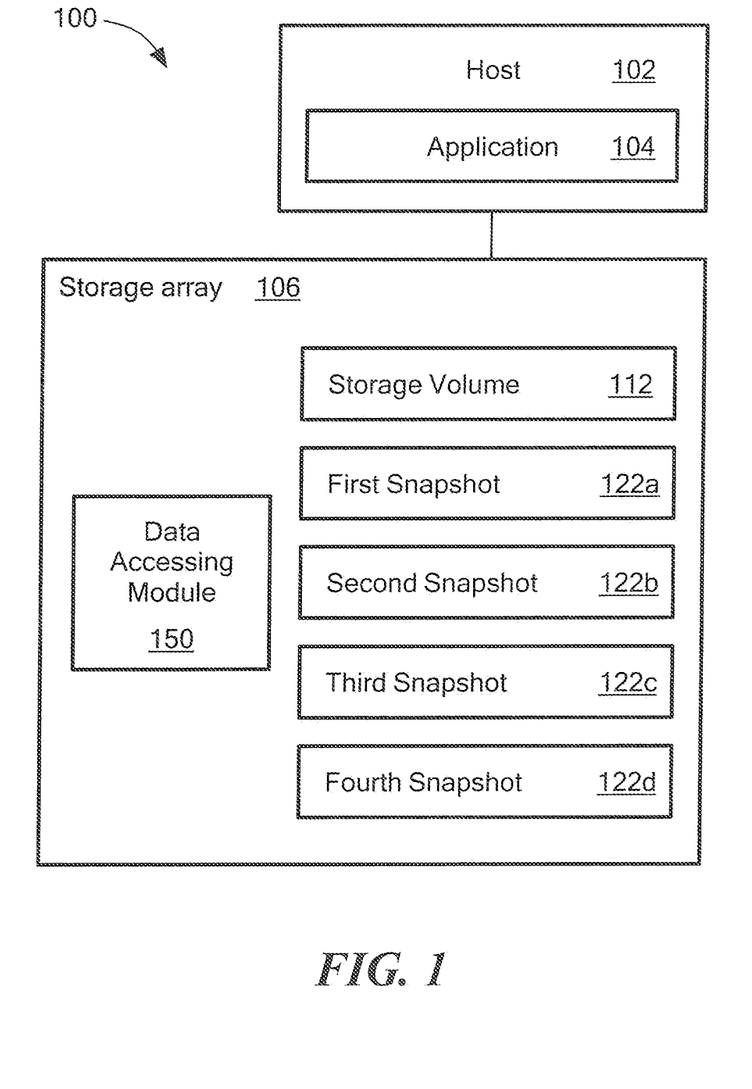
FIG. 1 is a block diagram of an example of a system used to generate snapshots.

Referring to FIG. 1, a system 100 includes a host 102 and a storage array 106. The host includes an application 104. The storage array 106 includes a storage volume 112 and snapshots (e.g., a first snapshot 122a, a second snapshot 122b, a third snapshot 122c and a fourth snapshot 122d). As will be further described the snapshots 122a-122d may include a snapshot of the storage volume 112 and/or snapshots of other snapshots 122a-122d. As also will be described herein, the snapshots 122a-122d are saved and accessed in a hierarchy or tree structure. The data accessing module 150 is used to retrieve data from the snapshots when requested, for example, by the application 104.

Figure 2:
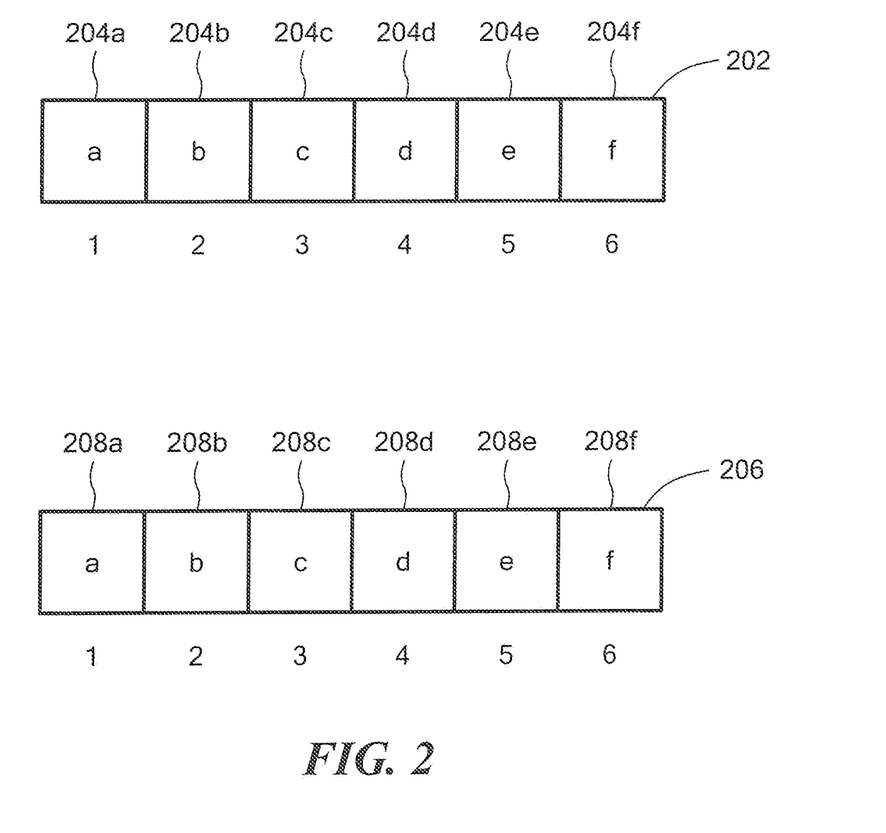
FIG. 2 is a block diagram depicting a volume and a snapshot of the volume.

Referring to FIG. 2, in hierarchical snapshots, the hierarchical snapshot tree (e.g., a hierarchical snapshot tree 300 in FIGS. 3A and 3B and a hierarchical snapshot tree 400 in FIG. 4)) is transparent to the application 104. For example, the application 104 sees a volume 202 and a volume 206, which is a snapshot of the volume 202. The volume 202 includes offsets (e.g., a first offset (offset 1) 204a, a second offset (offset 2) 204b, a third offset (offset 3) 204c, a fourth offset (offset 4) 204d, a fifth offset (offset 5) 204e and a sixth offset (offset 6) 204f. The offsets 204a-204f store values a, b, c, d, e, f, and g, respectively. The volume 206 of the volume 202 includes a volume 202 includes offsets (e.g., a first offset (offset 1) 208a, a second offset (offset 2) 208b, a third offset (offset 3) 208c, a fourth offset (offset 4) 208d, a fifth offset (offset 5) 208e and a sixth (offset 6) offset 208f. The offset 208a-208f store values a, b, c, d, e, f, g, respectively.

Figure 3A:
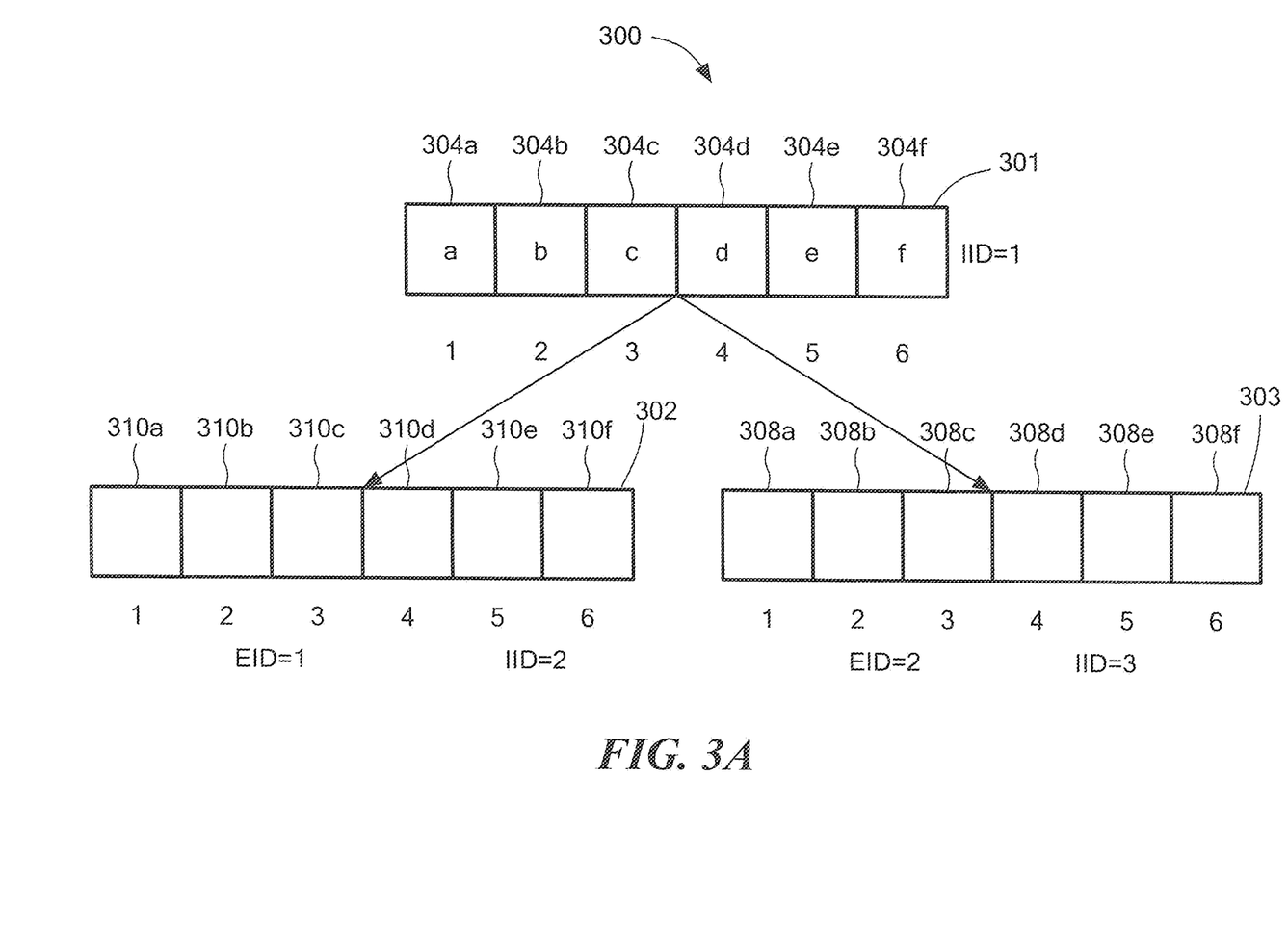
FIGS. 3A and 3B are diagrams of an example of a hierarchical snapshot tree.

Referring to FIG. 3A, the hierarchical snapshot tree 300 includes volumes (e.g., a logical unit devices or LUN 301, a LUN 302 and a LUN 303). The application 104 does not see the LUN 301. The LUN 301 includes offsets (e.g., a first offset (offset 1) 304a, a second offset (offset 2) 304b, a third offset (offset 3) 304c, a fourth offset (offset 4) 304d, a fifth offset (offset 5) 304e and a sixth (offset 6) offset 304f. The offsets 304a-304f store values a, b, c, d, e, f, g, respectively. The LUN 301 is designated with an internal ID (IID) equal to "1." The IID of a LUN is transparent to the application 104.

The LUN 302 represents an original LUN to the application 104. The LUN 301 includes offsets (e.g., a first offset (offset 1) 310a, a second offset (offset 2) 310b, a third offset (offset 3) 310c, a fourth offset (offset 4) 310d, a fifth offset (offset 5) 310e and a sixth (offset 6) offset 310f. The LUN 301 has IID equal to "2" and an external ID (EID) equal to "1". The EID is used by the application 104 to identify the LUN.

A LUN 303 is a snapshot of the LUN 300. The LUN 303 includes offsets (e.g., a first offset (offset 1) 308a, a second offset (offset 2) 308b, a third offset (offset 3) 308c, a fourth offset (offset 4) 308d, a fifth offset (offset 5) 308e and a sixth (offset 6) offset 308f. The LUN 302 has IID equal to "3" and an external ID (EID) equal to "2".

The offsets 310a-310f of LUN 302 and the offsets 308a-308f of LUN 303 have no values stored. Rather than having twice the amount of data stored, the data need only be saved in one location at LUN 301. The LUNs 302, 303 are leafs in the hierarchical snapshot tree and are identified to the application 104 through the EID. However, a LUN that does not have an EID (i.e., not a leaf) is transparent to the application 104. As used herein the LUN 300 is identified as an ancestor (i.e., a parent) of the LUNS 302, 303 (e.g., LUN 301) while the LUNS 302, 303 are children of the LUN 300.

If the application 104 requests to read data from the offset 4 (the fourth offset 308d) at the LUN 303, the data accessing module 150 determines that the offset 4 (the fourth offset 308d) is empty, and goes to the parent of the LUN 303 and in this example, to the offset 4 (the fourth offset 304d) of the LUN 301 and retrieves the value "d" and returns the value "d" to the application 104.

Figure 3B:
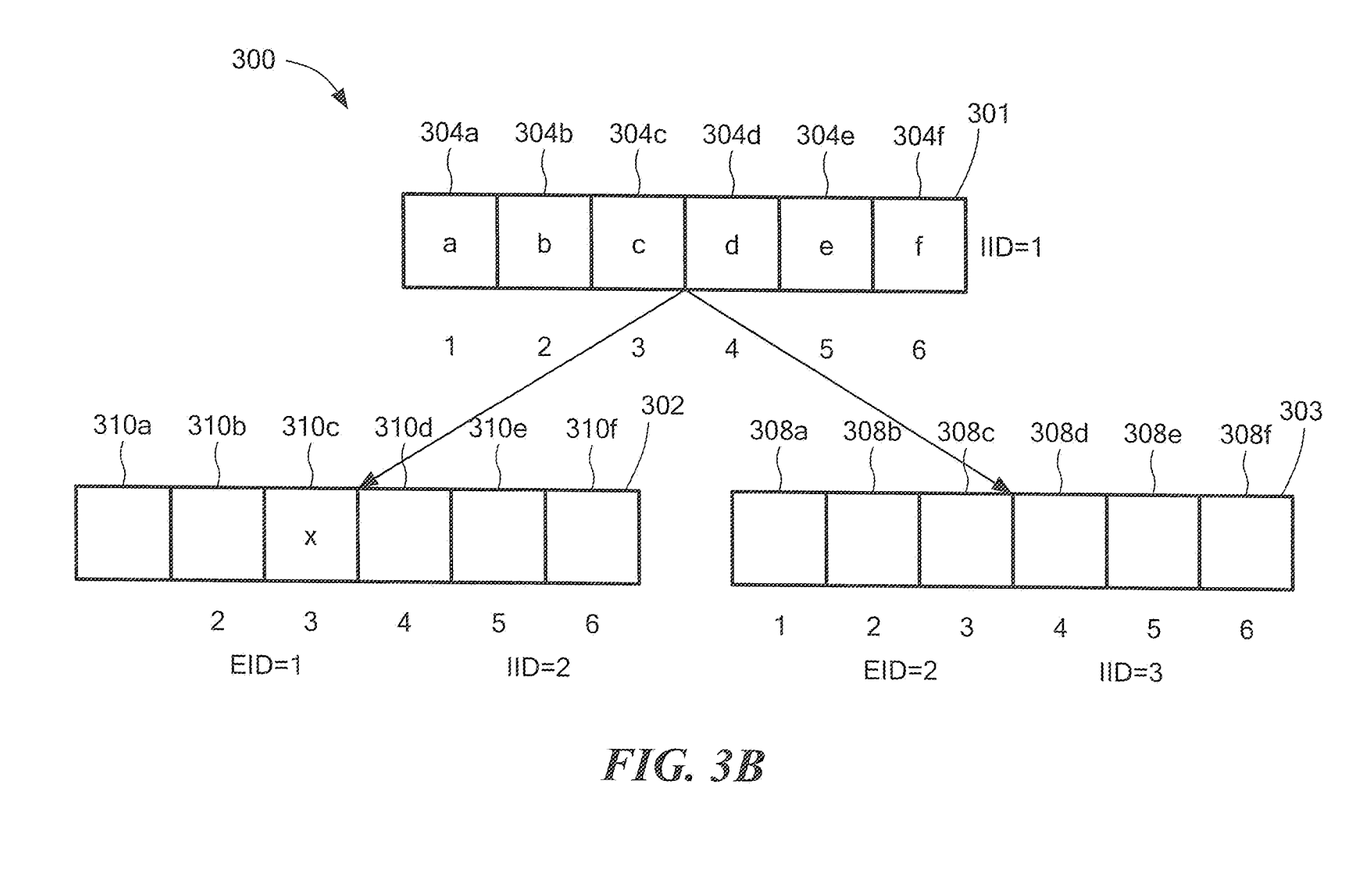

Referring to FIG. 3B, any updates to the original data in LUN 301 that are written by the application 104 are written instead to the LUN 302. For example, the application 104 or some other application (not shown) writes a value "x" to the offset 3 (the third offset 310c). If the application 104 needs to read the offset 3 (the third offset 310c) of the LUN 302, the data accessing module 150 would determine that the offset 3 (the third offset 310c) is not empty and return the value "x" to the application 104.

Figure 4:
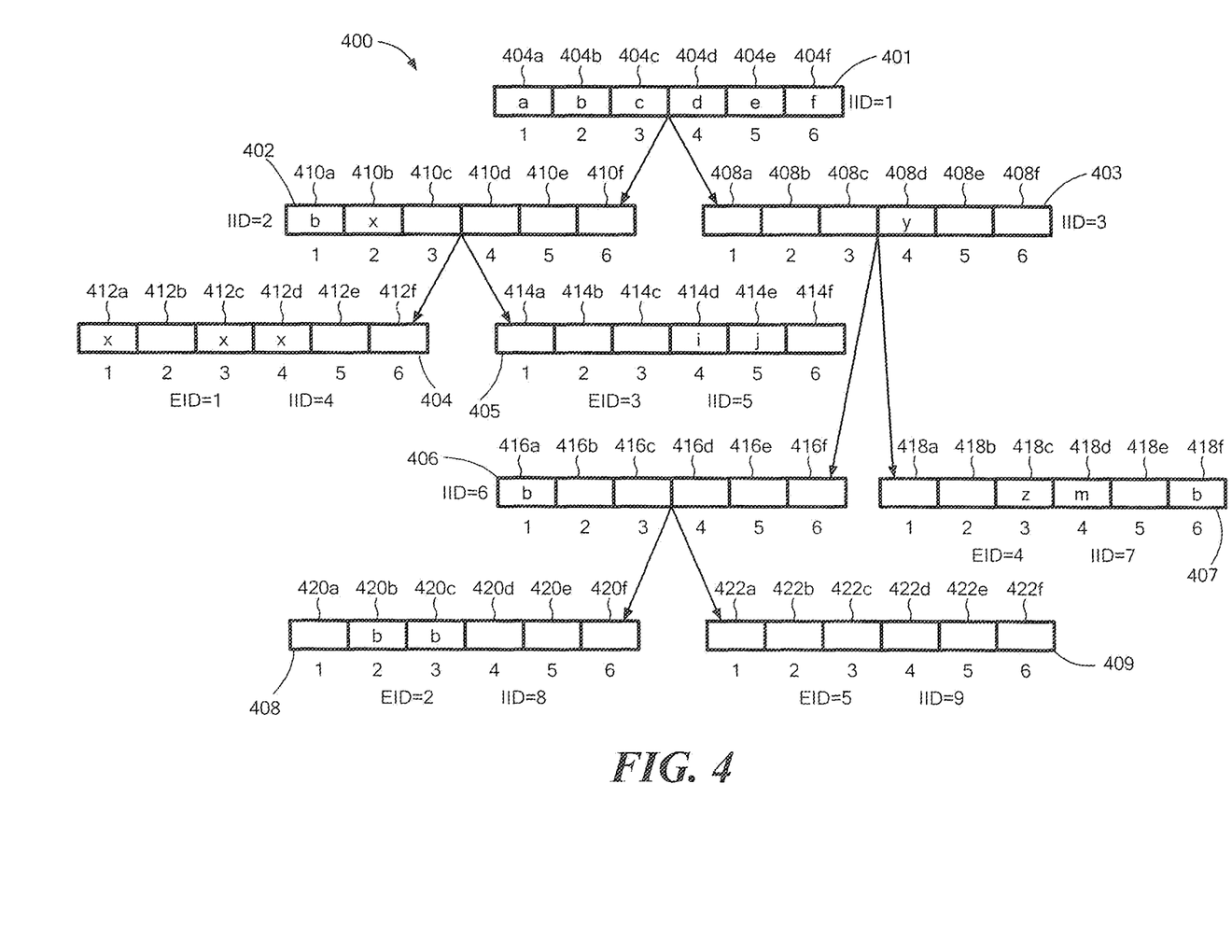
FIG. 4 is a diagram of another example of a hierarchical snapshot tree.

Referring to FIG. 4, the hierarchical snapshot tree 400 includes volumes (e.g., a logical unit devices or LUN 401-LUN 409). The LUN 403 is a snapshot of the original LUN 401, the LUN 405 is a snapshot of the LUN 402, the LUN 407 is a snapshot of the LUN 403 and the LUN 409 is a snapshot of the LUN 406. The LUNs 404, 405, 407, 408, 409 are leaf nodes.

The LUN 401 includes offsets (e.g., a first offset (offset 1) 404a, a second offset (offset 2) 404b, a third offset (offset 3) 404c, a fourth offset (offset 4) 404d, a fifth offset (offset 5) 404e and a sixth (offset 6) offset 404f. The offsets 404a-404f store values a, b, c, d, e, f, g, respectively. The LUN 401 is designated with an IID equal to "1."

The LUN 402 includes offsets (e.g., a first offset (offset 1) 410a, a second offset (offset 2) 410b, a third offset (offset 3) 410c, a fourth offset (offset 4) 410d, a fifth offset (offset 5) 410e and a sixth (offset 6) offset 410f. The offset 410a, 410b store values "b" and "x," respectively while the offsets 410c-410f are empty. The LUN 402 is designated with an IID equal to "2."

The LUN 403 includes offsets (e.g., a first offset (offset 1) 408a, a second offset (offset 2) 408b, a third offset (offset 3) 408c, a fourth offset (offset 4) 408d, a fifth offset (offset 5) 408e and a sixth (offset 6) offset 408f. The offset 408d stores a value "y" while the offsets 408a-408c and the offsets 408e, 408f are empty. The LUN 403 is designated with an IID equal to "3."

The LUN 404 includes offsets (e.g., a first offset (offset 1) 412a, a second offset (offset 2) 412b, a third offset (offset 3) 412c, a fourth offset (offset 4) 412d, a fifth offset (offset 5) 412e and a sixth (offset 6) offset 412f. The offset 412a, 412c, 412d store values "x", "x" and "x", respectively, while the offset 412b and offsets 412e, 412f are empty. The LUN 404 is designated with an IID equal to "4" and EID equal to "1."

The LUN 405 includes offsets (e.g., a first offset (offset 1) 414a, a second offset (offset 2) 414b, a third offset (offset 3) 414c, a fourth offset (offset 4) 414d, a fifth offset (offset 5) 414e and a sixth (offset 6) offset 414f. The offsets 414d, 414 store values "i" and "j," respectively, while the offsets 414a-414c and offset 412f are empty. The LUN 405 is designated with an ID equal to "5" and EID equal to "3."

The LUN 406 includes offsets (e.g., a first offset (offset 1) 416a, a second offset (offset 2) 416b, a third offset (offset 3) 416c, a fourth offset (offset 4) 416d, a fifth offset (offset 5) 416e and a sixth (offset 6) offset 416f. The offset 416a stores a value "b" and while the offsets 416b-416f are empty. The LUN 406 is designated with an IID equal to "6."

The LUN 407 includes offsets (e.g., a first offset (offset 1) 418a, a second offset (offset 2) 418b, a third offset (offset 3) 418c, a fourth offset (offset 4) 418d, a fifth offset (offset 5) 418e and a sixth (offset 6) offset 418f. The offsets 418c, 418d, 418f store values "z", "m" and "b," respectively while the offsets 418a, 418c, 418e are empty. The LUN 407 is designated with an IID equal to "7" and an EID equal to "4."

The LUN 408 includes offsets (e.g., a first offset (offset 1) 420a, a second offset (offset 2) 420b, a third offset (offset 3) 420c, a fourth offset (offset 4) 420d, a fifth offset (offset 5) 420e and a sixth (offset 6) offset 420f. The offsets 420b, 420c store values "b" and "b," respectively while the offset 420a and the offsets 420d-420f are empty. The LUN 408 is designated with an IID equal to "8" and an EID equal to "2."

The LUN 409 includes offsets (e.g., a first offset (offset 1) 422a, a second offset (offset 2) 422b, a third offset (offset 3) 422c, a fourth offset (offset 4) 422d, a fifth offset (offset 5) 422e and a sixth (offset 6) offset 422f. The offset 422c stores a value "b" while the offsets 422b-422f are empty. The LUN 409 is designated with an IID equal to "9" and an EID equal to "5."

If the application 104 requests to read the LUN with an EID of "5" at the fourth offset, one method would require first going to the LUN 409 and reading the fourth offset 422d. Since no data is available at the offset 422d, the parent of LUN 409, the LUN 406, is read at the fourth offset, 416d. Since no data is available at the offset 416d, the parent of LUN 406, the LUN 403, is read at the fourth offset, 408d. Since data is available at the offset 408d, the value "y" is returned to the application 104. As will be described further, a better approach would be to use bitmaps.

Figure 5:
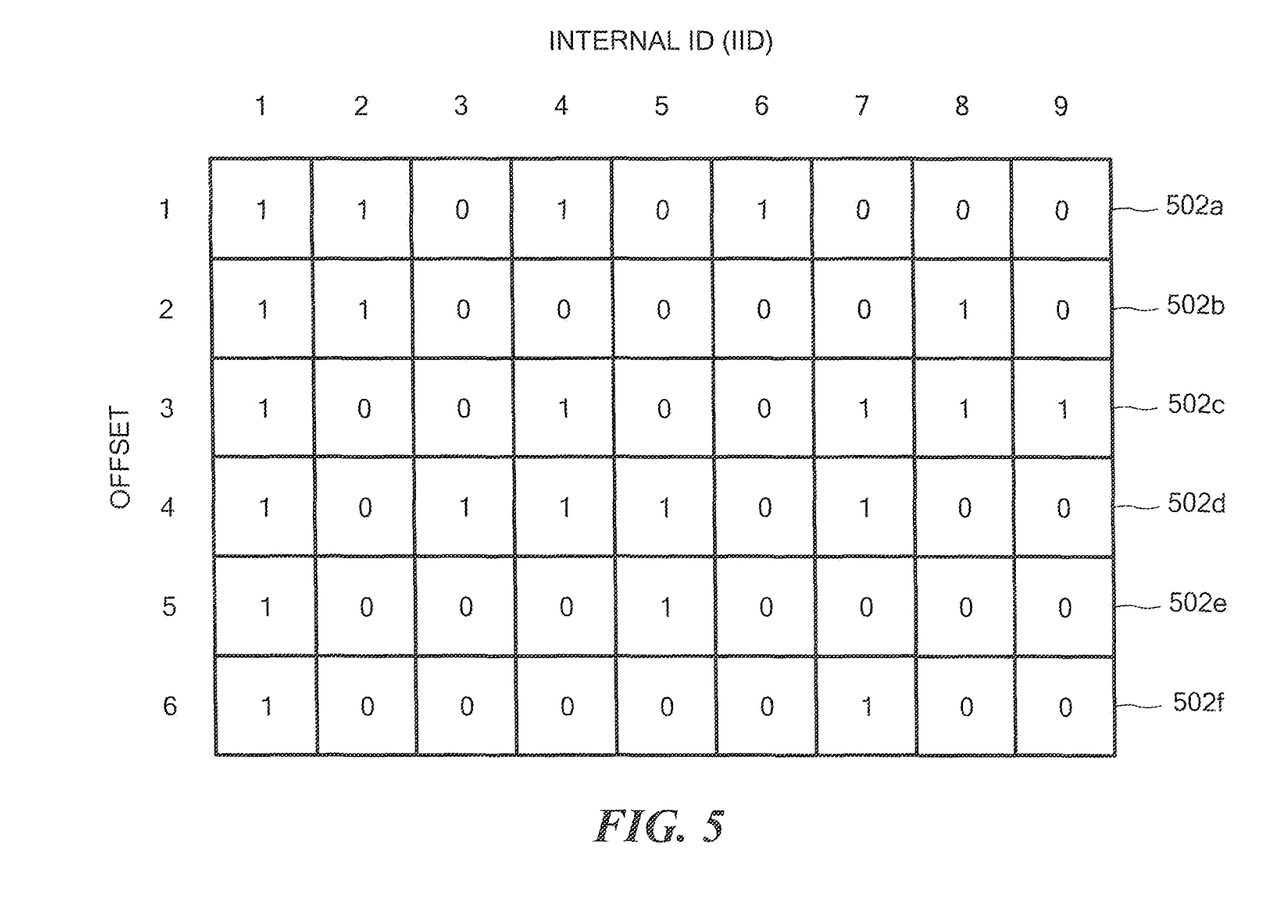
FIG. 5 is a diagram of a plurality of bitmaps for the hierarchical snapshot tree in FIG. 4.

Referring to FIG. 5, each offset in the hierarchical snapshot tree may be represented by a bitmap. For example, the offset 1, which includes offsets 404a, 410a, 408a, 412a, 414a, 416a, 418a, 420a, 422a, is represented by the bitmap 502a. The offset 2, which includes offsets 404b, 410b, 408b, 412b, 414b, 416b, 418b, 420b, 422b, is represented by the bitmap 502b. The offset 3, which includes offsets 404c, 410c, 408c, 412c, 414c, 416c, 418c, 420c, 422c, is represented by the bitmap 502c. The offset 4, which includes offsets 404d, 410d, 408d, 412d, 414d, 416d, 418d, 420d, 422d, is represented by the bitmap 502d. The offset 5, which includes offsets 404e, 410 e, 408e, 412e, 414e, 416e, 418e, 420e, 422e, is represented by the bitmap 502e. The offset 6, which includes offsets 404f, 410f, 408f, 412f, 414f, 416f, 418f, 420f, 422f, is represented by the bitmap 502f. Each "1" in a bitmap indicates that a value is stored there. For example, in the bitmap 502d for offset 4 under IID 3 there is a "1," which corresponds to a value "y" being stored at the LUN 403. Instead of traversing the tree 400 to find the data when reading the fourth offset 422d in LUN 409 as previously described, the data accessing module 150 reads the bitmap instead.

Figure 6:
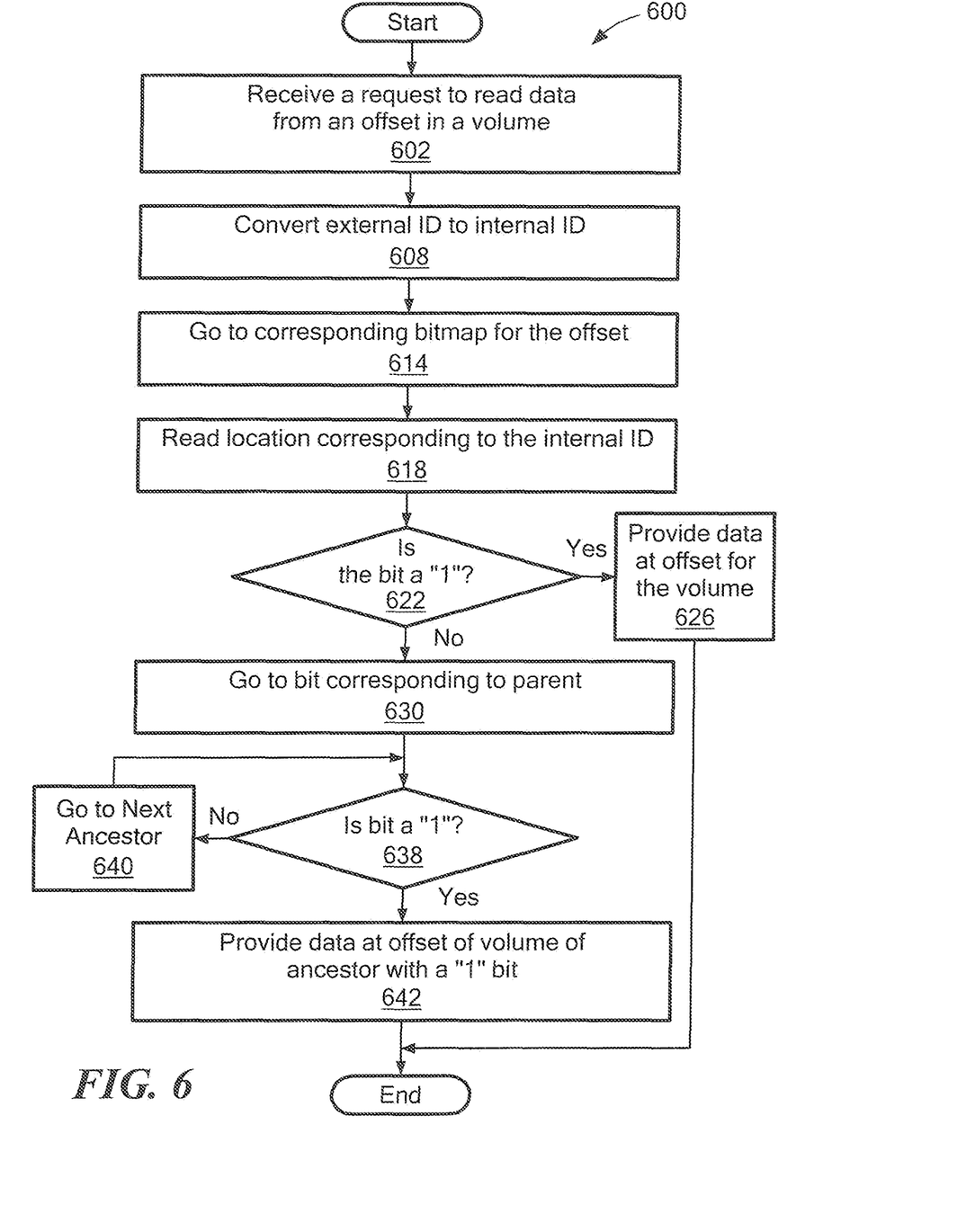
FIG. 6 is a flowchart of an example of a process to access data in hierarchical snapshots.

Referring to FIG. 6, an example of a process to access data in hierarchical snapshots is a process 600. Process 600 receives a request to read data from an offset in a volume (602). For example, the data accessing module 150 receives a request from the application 104 to read the fourth offset 422d of the LUN with an EID of "5."

Process 600 converts the EID to an internal ID (608). For example, the data accessing module 150 converts the EID equal to "5" to an IID equal to "9."

Process 600 goes to the corresponding bitmap for the offset (614) and reads the location corresponding to the internal ID (618). For example, the data accessing module 150 goes to the bitmap 502d and reads the value corresponding to the IID equal to 9.

Process 600 determines if the bit stored is a "1" (622). If the bit is a "1," then process 600 provides data at the offset for the volume (626). For example, if the bitmap 502c is read for the IID equal to "9," then after reading a "1," the data accessing module 150 provides the value "b" from the data offset 422c to the application 104.

If the bit is not a "1," then process 600 goes to bit in the bitmap corresponding to the parent (630). For example, if the bitmap 502d is read for the IID equal to "9," then after reading a "0," the data accessing module 150 reads the bit for the parent of LUN 409, the LUN 406, having an IID of 6. In one example, the data accessing module 150 uses ancestor data (e.g., ancestor data 726 in FIG. 8) to determine the parent of each LUN.

Process 600 determines if the bit stored is a "1" (638). If the bit is not a "1," then process 600 goes to the bit in the bitmap corresponding to the next ancestor (640). Process 600 repeats processing blocks 638 and 640 until a bit is a "1." If the bit is a "1," then process 600 provides data at the offset of the volume with ancestor with bit equal to "1" (642). For example, the data accessing module 150 provides the data at the offset of the volume with ancestor with bit equal to "1."

Figure 7:
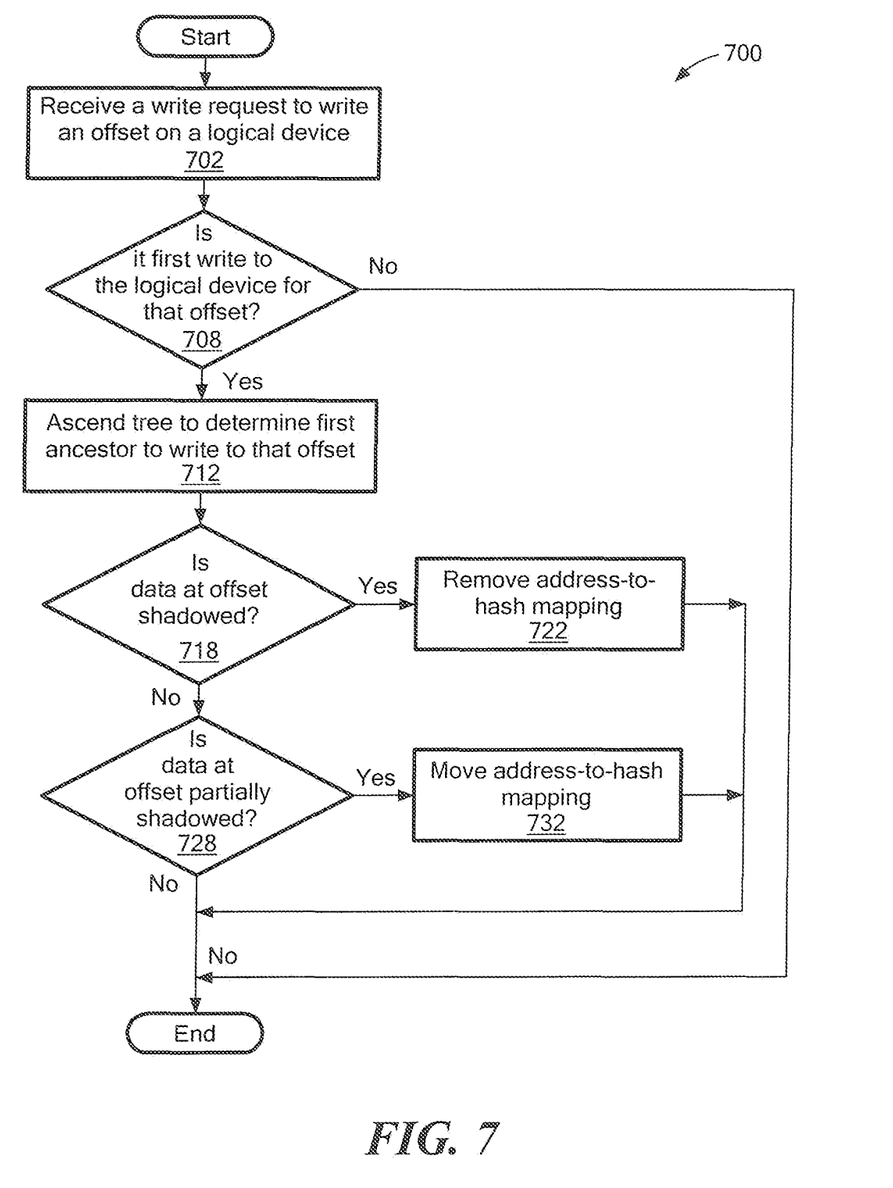
FIG. 7 is a flowchart of an example of a process to improve snapshot efficiency.

Referring to FIG. 7, an example of a process to improve snapshot efficiency is a process 700. The system 100 uses address-to-hash mapping. That is, address-to-has mapping is a mapping from an offset to a hash of the content at the offset. As will be described further herein process 700 attempts to locate shadowed data and partially shadowed data. Shadowed data means the mapping is no longer accessible from any external LUNs. Partially shadowed data means the mapping is accessible from an external LUN associated with a descendant of one of its children.

The bitmaps of the offsets such as, for example, bitmaps 502a-502f may be used to identify shadowed and partially shadowed data. For example, whenever data is written to a specific offset, the bitmap is checked to determine whether the current write operation causes data in an ancestor LUN to be shadowed and if so the shadowed data is removed. In another example, for partially shadowed data, that is, if the data is only shadowed on one branch of the snapshot then the data is moved down to the snapshot on the other branch.

Process 700 receives a write request to write to an offset (block) on a device (702) and determines if it is a first write to the device for that offset (708). For example, for the LUN 407 an "m" is written to offset 418d and it is the first time the offset 418d was written to. In particular, the bitmap 502d is used to determine if a data has been written to offset 418d (offset 4) for the first time.

If it is not the first write to the device for that offset process 700 ends. If it is the first write to the device for that offset, process 700 ascends tree to determine first ancestor to write to that offset (712). For example, if it is the first time that the offset 418d of the LUN 407 was written to, process 700 goes to the ancestor of the LUN 407, LUN 403, which has a "y" written to the offset 408d (offset 4). In one particular example, the bitmap 502d is used to determine the first ancestor.

Process 700 determines if the data at the offset for the device is shadowed (718). If the data at the offset is shadowed, process 700 removes the address-to-hash mapping for that address (offset) (722). For example, the address-to-hash mapping is removed from a hash table for the address (offset) of the logical device. In one particular example, using the bitmap 502d, it is determined that an "x" is written to the LUN 404 at the offset 412d (offset 4) for the first time and it is also determined, using the bitmap 502d, that the LUN 401 is the first ancestor that has the offset 4 written to it (i.e., a "d" is written to offset 404d) ascending up the hierarchical tree 400. Using the bitmap 502d, it is determined that there is no external device (e.g., LUN 404, LUN 405, LUN 407, LUN 408 and LUN 409) that accesses the offset 404d. Thus, "d" in the offset 404d is shadowed data and the address-to-hash mapping for the offset 404d may be removed. The bitmap 502d is updated.

If the data at the offset for that device is not shadowed, process 700 determines if the data at the offset is partially shadowed (728). If process 700 determines that the data at the offset for the device is partially shadowed, process 700 moves address-to-hash mapping to an address down the tree to a single descendent (732). In one example, atomically, the original entry is removed from a hash table and a new entry on a child is generated in the hash table. That is, the address-to-hash mapping is moved down to a single descendant in the tree that has sole access to that offset. In one particular example, using the bitmap 502c, it is determined that an "x" is written to the LUN 404 at the offset 412c (offset 3) for the first time and it is also determined, using the bitmap 502c, that the LUN 401 is the first ancestor that has the offset 3 written to it (i.e., a "c" is written to offset 404c) ascending up the hierarchical tree 400. Using the bitmap 502c, it is determined that there is one external device (e.g., LUN 405) that accesses the offset 404c. Thus, "c" in the offset 404c is partially shadowed data and the address-to-hash mapping for the offset 404c is moved to the offset 414c. The bitmap 502c is updated.

Moving partially shadowed data to a lower snapshot involves updating the existence bitmap and related metadata, but the actual data itself is not copied. A benefit of the moving the data is that future accesses to this data are more efficient. Also, moving partially shadowed data to a lower snapshot solves the problem with deletion of snapshots, since the partially shadowed data that would have been needed to discover during the snapshot deletion (those offsets that were written to all the other descendants but not to the deleted volume) has already been moved into the snapshot. Hence, a deletion thread only needs to operate on those offsets that are written in the snapshot, rather than needing to scan over the entire LUN.

If process 700 determines that the data at the offset for the device is not partially shadowed, process 700 ends.

Figure 8:
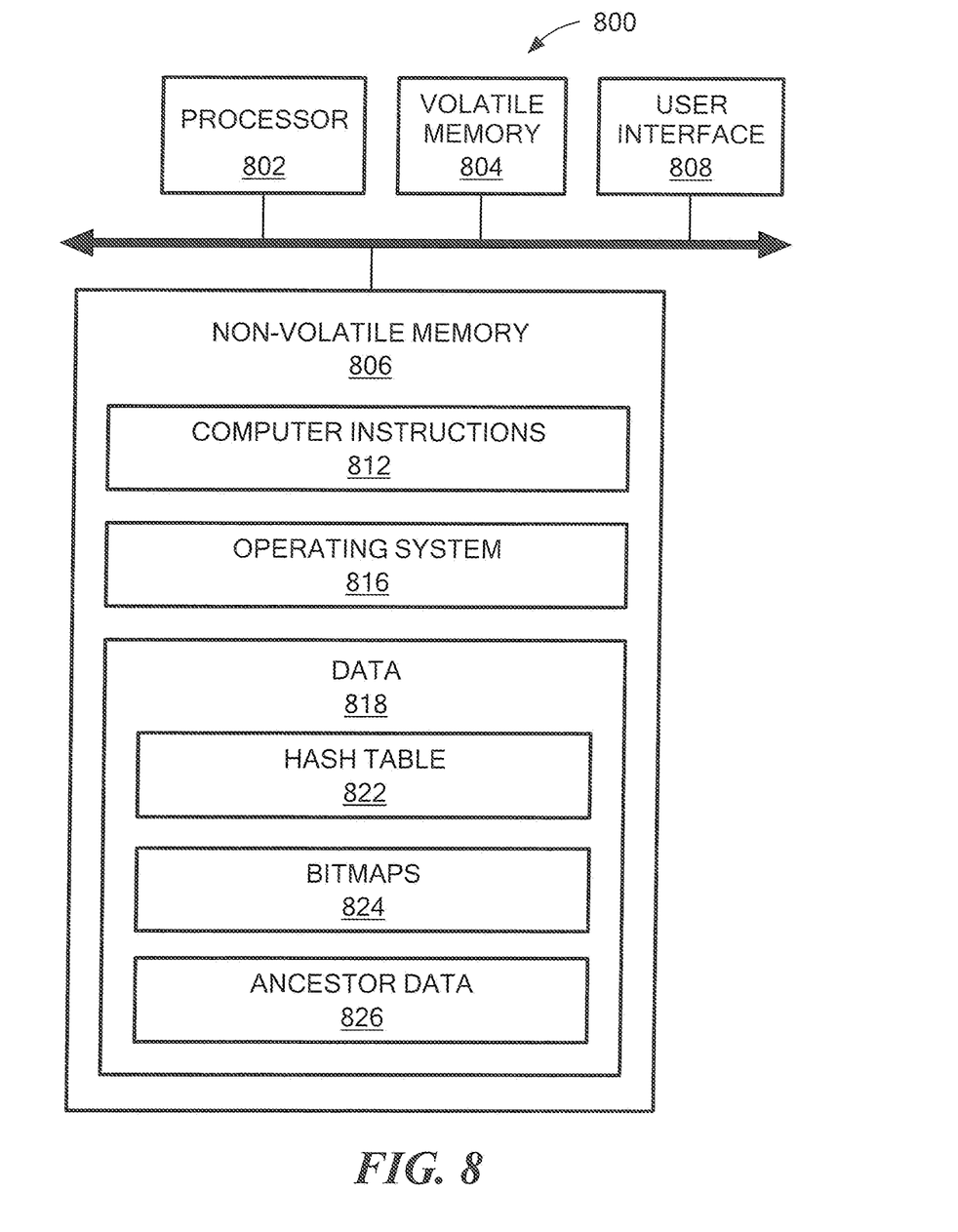
FIG. 8 is a computer on which any of the processes of FIGS. 6 and 7 may be implemented.

Referring to FIG. 8, an example of a data accessing module 150 is a computer 800. The computer 800 includes a processor 802, a volatile memory 804, a non-volatile memory 806 (e.g., hard disk) and the user interface (UI) 808 (e.g., a graphical user interface, a mouse, a keyboard, a display, touch screen and so forth). The non-volatile memory 806 stores computer instructions 812, an operating system 816 and data 818. The data 818 includes hash table 822, bitmaps 824 (e.g., bitmaps 502a-502f) and the ancestor data 826. In one example, the computer instructions 812 are executed by the processor 802 out of volatile memory 804 to perform all or part of the processes described herein (e.g., processes 600 and 700).

The processes described herein (e.g., processes 600 and 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 600 and 700 are not limited to the specific processing order of FIGS. 6 and 7. Rather, any of the processing blocks of FIGS. 6 and 7 may be re-ordered, combined or removed, performed in parallel or in serial, as necessary, to achieve the results set forth above.

In other examples, one of ordinary skill in the art would recognize that instead of using a "1" in the bitmap to represent that data is stored at a volume, a "0" may be used.

The processing blocks (for example, in the processes 600 and 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:
1. A method comprising:
receiving a plurality of write request requests to write to an offset in a first logical device;
determining, for each write request received, a second logical device that wrote to the offset, the second logical device being an ancestor of the first logical device in a hierarchical tree of snapshots;
determining, for each write request received, from descendants of the second logical device in the hierarchical tree whether data in the offset of the second logical device is shadowed data or partially shadowed data;
and for each write request received, removing an address-to-hash mapping for the offset of the second logical device if the data for the offset is shadowed; and moving the address-to-hash mapping to a single descendant that has sole access to the offset of the second logical device if the data for the offset is partially shadowed.

2. The method of claim 1, wherein determining a second logical device that wrote to the offset comprises ascending the hierarchical tree from the first logical device to determine a second logical device that is the first to write to the offset.

3. The method of claim 1, wherein determining a second logical device that wrote to the offset comprises determining a second logical device that wrote to the offset using a bitmap of the offset.

4. The method of claim 1, wherein determining from decedents of the second logical device in the hierarchical tree whether data in the offset of the second logical device is shadowed data or partially shadowed data comprises determining from decedents of the second logical device in the hierarchical tree whether data in the offset of the second logical device is shadowed data or partially shadowed data using a bitmap of the offset.

5. The method of claim 1, wherein data in the offset of the second logical device is shadowed data if no external device may access the data in the offset of the second logical unit.

6. The method of claim 1, wherein data in the offset of the second logical device is partially shadowed data if only one external device may access the data in the offset of the second logical unit.

7. An apparatus, comprising:
electronic hardware circuitry configured to:
receive a plurality of write requests to write to an offset in a first logical device;
determine, for each write request, a second logical device that wrote to the offset, the second logical device being an ancestor of the first logical device in a hierarchical tree of snapshots;

determine, for each write request, from descendants of the second logical device in the hierarchical tree whether data in the offset of the second logical device is shadowed data or partially shadowed data;

and for each write request received, remove an address-to-hash mapping for the offset of the second logical device if the data for the offset is shadowed; and move the address-to-hash mapping to a single descendent that has sole access to the offset of the second logical device if the data for the offset is partially shadowed.

8. The apparatus of claim 7, wherein the circuitry comprises at least one of a processor, a memory, a programmable logic device or a logic gate.

9. The apparatus of claim 7, wherein the circuitry configured to determine a second logical device that wrote to the offset comprises circuitry configured to ascend the hierarchical tree from the first logical device to determine a second logical device that is the first to write to the offset.

10. The apparatus of claim 7, wherein the circuitry configured to determine a second logical device that wrote to the offset comprises circuitry configured to determine a second logical device that wrote to the offset using a bitmap of the offset.

11. The apparatus of claim 7, wherein the circuitry configured to determine from decedents of the second logical device in the hierarchical tree whether data in the offset of the second logical device is shadowed data or partially shadowed data comprises circuitry configured to determine from decedents of the second logical device in the hierarchical tree whether data in the offset of the second logical device is shadowed data or partially shadowed data using a bitmap of the offset.

12. The apparatus of claim 7, wherein data in the offset of the second logical device is shadowed data if no external device may access the data in the offset of the second logical unit.

13. The apparatus of claim 7, wherein data in the offset of the second logical device is partially shadowed data if only one external device may access the data in the offset of the second logical unit.

14. An article comprising:
a non-transitory computer-readable medium that stores computer-executable instructions the instructions causing a machine to:

receive a plurality of write requests to write to an offset in a first logical device;

determine, for each write request, a second logical device that wrote to the offset, the second logical device being an ancestor of the first logical device in a hierarchical tree of snapshots;

determine, for each write request, from descendants of the second logical device in the hierarchical tree whether data in the offset of the second logical device is shadowed data or partially shadowed data;

and for each write request received, remove an address-to-hash mapping for the offset of the second logical device if the data for the offset is shadowed; and move the address-to-hash mapping to a single descendent that has sole access to the offset of the second logical device if the data for the offset is partially shadowed.

15. The article of claim 14, wherein the instructions causing the machine to determine a second logical device that wrote to the offset comprises instructions causing the machine to ascend the hierarchical tree from the first logical device to determine a second logical device that is the first to write to the offset.

16. The article of claim 14, wherein the instructions causing the machine to determine a second logical device that wrote to the offset comprises instructions causing the machine to determine a second logical device that wrote to the offset using a bitmap of the offset.

17. The article of claim 14, wherein the instructions causing the machine to determine from decedents of the second logical device in the hierarchical tree whether data in the offset of the second logical device is shadowed data or partially shadowed data comprises instructions causing the machine to determine from decedents of the second logical device in the hierarchical tree whether data in the offset of the second logical device is shadowed data or partially shadowed data using a bitmap of the offset.

18. The article of claim 14, wherein data in the offset of the second logical device is shadowed data if no external device may access the data in the offset of the second logical unit.

19. The article of claim 14, wherein data in the offset of the second logical device is partially shadowed data if only one external device may access the data in the offset of the second logical unit.

* * * * *